United States Patent
Kroll et al.

(10) Patent No.: US 9,636,869 B2
(45) Date of Patent: May 2, 2017

(54) ADDITIVE LAYER MANUFACTURING METHOD FOR PRODUCING A THREE-DIMENSIONAL OBJECT

(71) Applicant: Airbus Operations GmbH, Hamburg (DE)

(72) Inventors: Lothar Kroll, Dresden (DE); Frank Schubert, Marienberg (DE); Sebastian Blümer, Chemnitz (DE); Gerhard Hummel, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/199,556

(22) Filed: Mar. 6, 2014

(65) Prior Publication Data

US 2014/0251481 A1    Sep. 11, 2014

Related U.S. Application Data

(60) Provisional application No. 61/774,119, filed on Mar. 7, 2013.

(30) Foreign Application Priority Data

Mar. 7, 2013    (DE) .......................... 10 2013 203 938

(51) Int. Cl.
*B29C 41/02* (2006.01)
*B29C 67/00* (2017.01)
(Continued)

(52) U.S. Cl.
CPC ........ *B29C 67/0077* (2013.01); *B22F 3/1055* (2013.01); *B29C 67/0092* (2013.01);
(Continued)

(58) Field of Classification Search
CPC .................. B22F 3/008; B22F 3/1055; B22F 2003/1058; B29C 67/0077; B29C 67/0092
(Continued)

(56) References Cited

U.S. PATENT DOCUMENTS 4,961,154 A * 10/1990 Pomerantz ............ B29C 67/007
    264/482 X
7,172,724 B2    2/2007 Abe et al.
(Continued)

FOREIGN PATENT DOCUMENTS

| CN | 1446652 A | 10/2003 |
|---|---|---|
| CN | 1753747 A | 3/2006 |

(Continued)

OTHER PUBLICATIONS

Chinese Office Action for Application No. 2014 100 812 59.3 dated Sep. 22, 2015.
(Continued)

*Primary Examiner* — Leo B Tentoni
(74) *Attorney, Agent, or Firm* — Jenkins, Wilson, Taylor & Hunt, P.A.

(57) ABSTRACT

An additive layer manufacturing method is disclosed for producing a three-dimensional object and to a corresponding object. Layers of a powder material are applied to a carrier and irradiated, before the following layer is applied, with a laser beam or particle beam selectively only in the areas of the layer which correspond to the three-dimensional object to be produced. Irradiation occurs such that the powder material in the corresponding areas is locally melted or sintered. A first portion is constructed before a second portion or the first portion is provided as a separate component, on which a support structure and second portion are constructed. The support structure is constructed in the form (Continued)

of a plurality of support legs, which extend from the first portion to the second portion and are connected thereto at their opposite ends and are spaced apart from one another at least along part of their length.

21 Claims, 3 Drawing Sheets

(51) Int. Cl.
| | | |
|---|---|---|
| *F16L 3/00* | (2006.01) | |
| *B22F 3/105* | (2006.01) | |
| *B33Y 10/00* | (2015.01) | |
| *B33Y 40/00* | (2015.01) | |
| *B29L 9/00* | (2006.01) | |

(52) U.S. Cl.
CPC .............. *B33Y 10/00* (2014.12); *B33Y 40/00* (2014.12); *F16L 3/00* (2013.01); *B29L 2009/00* (2013.01); *Y02P 10/295* (2015.11)

(58) Field of Classification Search
USPC ................ 264/460, 461, 482, 485, 497; 219/121.17, 121.35, 121.66, 121.85
See application file for complete search history.

(56) References Cited

U.S. PATENT DOCUMENTS

| | | | |
|---|---|---|---|
| 2006/0208396 | A1 | 9/2006 | Abe et al. |
| 2009/0176007 | A1* | 7/2009 | Uckelmann ......... B29C 67/0077 427/8 |
| 2009/0255602 | A1* | 10/2009 | McMasters ............ B23P 6/007 138/115 |
| 2012/0113439 | A1 | 5/2012 | Ederer |
| 2012/0217226 | A1 | 8/2012 | Bayer et al. |

FOREIGN PATENT DOCUMENTS

| | | |
|---|---|---|
| CN | 100377816 C | 4/2008 |
| CN | 101 653827 A | 2/2010 |
| CN | 102 178573 A | 9/2011 |
| DE | 10 2006 062 373 | 6/2008 |
| DE | 10 2007 033 434 | 1/2009 |
| WO | WO 01/02160 A1 | 1/2001 |
| WO | WO 2012/166546 | 12/2012 |
| WO | WO 2012166526 A2 | 12/2012 |

OTHER PUBLICATIONS

German Search Report for Application No. 10 2013 203 938.7 dated Nov. 4, 2013.

* cited by examiner

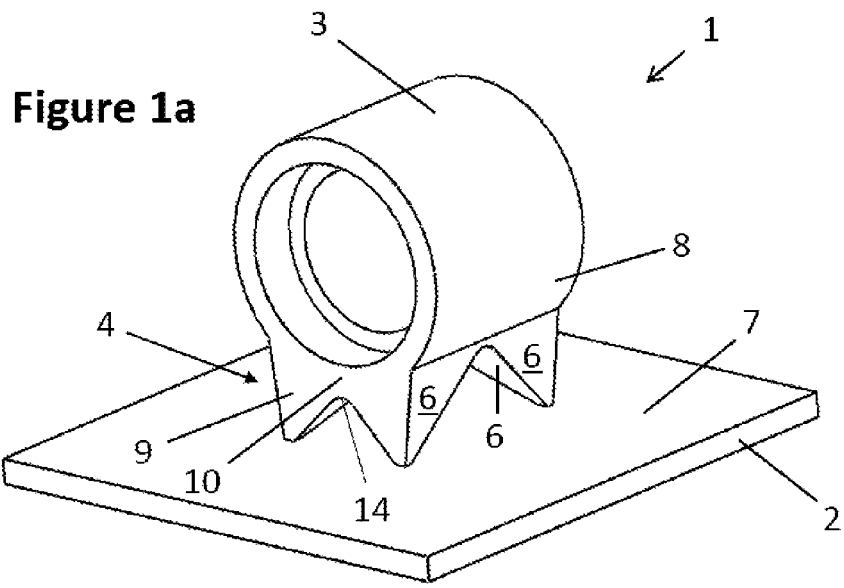
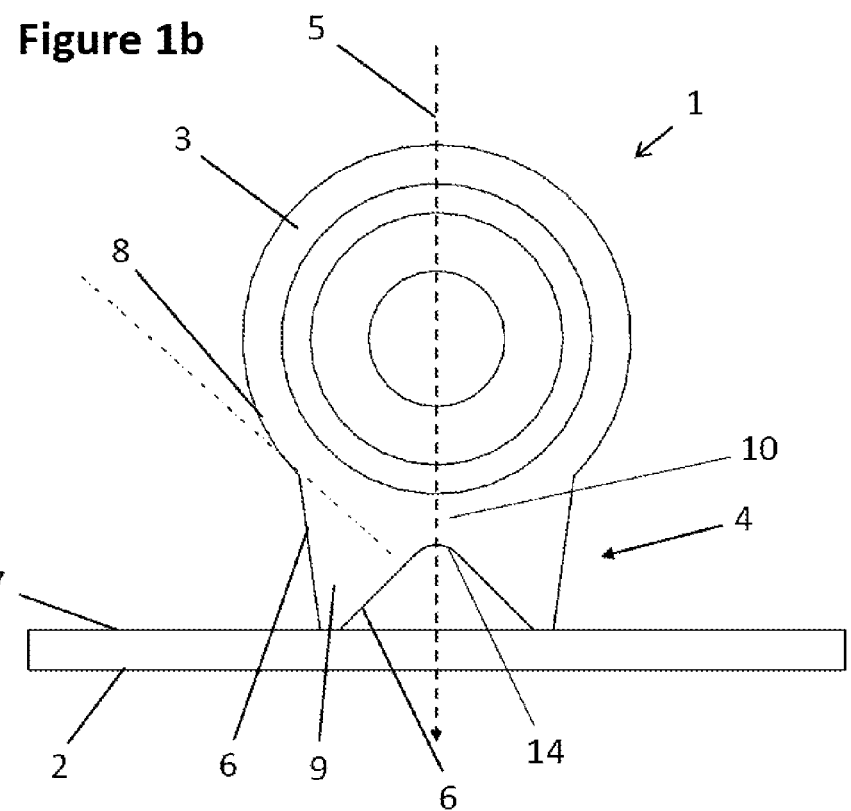

ADDITIVE LAYER MANUFACTURING METHOD FOR PRODUCING A THREE-DIMENSIONAL OBJECT

CROSS-REFERENCE TO RELATED APPLICATIONS

This application claims priority to and the benefit of U.S. Provisional Patent Application Ser. No. 61/774,119 and to German Patent Application Serial No. DE 10 2013 203 938.7, both of which were filed Mar. 7, 2013, the entire disclosures of which are both incorporated by reference herein.

TECHNICAL FIELD

The present invention relates to a generative or additive layer manufacturing method for producing a three-dimensional object and to a three-dimensional object which can be produced using such a method.

BACKGROUND

Generative or additive layer manufacturing methods are increasingly being used to produce prototypes or completed components very quickly. In contrast to conventional production processes, which comprise removing material from a block of material by, for example, milling, cutting, drilling or other machining processes, additive layer manufacturing methods construct a desired three-dimensional object directly layer by layer based on a digital description or representation of the object. They are also known as 3D printing or rapid prototyping.

In a typical additive layer manufacturing method a thin layer of material, from which the object is to be produced, is first applied to a carrier plate in powder form and the powder of the layer which has just been applied is melted or sintered using laser radiation selectively only in those areas of the layer which correspond to the object to be manufactured. A further thin layer of the material in powder form is then applied to the thus-processed first layer and in turn melted or sintered using laser radiation selectively only in those areas of the layer which correspond to the object to be produced. This step is repeated until the complete object has been manufactured. In each layer, the powder which does not correspond to the object is not irradiated and remains in powder form, with the result that it can be removed from the completed object at a later time. The carrier plate can be provided by a movable table which, after each irradiation of a layer, is moved downwardly by a distance which is identical to the thickness of this layer to ensure that the starting conditions are identical before each layer is applied.

It is to be pointed out in this connection that it is in principle also possible for the individual layers not to be continuous or to completely cover the carrier plate but to have material only in those areas which correspond to the object to be produced or in areas which comprise those areas which correspond to the object to be produced.

Specific additive layer manufacturing methods are the so-called selective laser melting (SLM) and the so-called selective laser sintering (SLS), in which, as indicated above, a laser beam is used to irradiate the layers. However, it is also possible to use a particle beam and in particular an electron beam for this purpose. Specific additive layer manufacturing method which use an electron beam are, corresponding to the two processes mentioned previously, the so-called selective electron beam melting and the so-called selective electron beam sintering.

As explained above, the object is constructed directly layer by layer in a three-dimensional manner. This makes it possible to produce different highly complex objects efficiently and quickly in the same device from different materials, in particular from metal but also from plastics and ceramic materials. For example, highly complex grid or honeycomb structures which cannot be generated, or can only be generated with difficulty, using other processes can be easily produced. In comparison with traditional production processes, the complexity of the object has only a limited influence on the production costs.

In additive layer manufacturing methods such as those mentioned above it must be noted, however, that, in areas of the object which form an overhang or a projecting or cantilevered portion during the layer-by-layer construction (i.e. in the orientation of the object during its production) viewed in the direction opposite to the force of gravity, particular measures may have to be taken to enable the manufacturing of the object or to increase its geometrical precision. In such areas, which are designated as overhang in the framework of this application, a melted or sintered part of each layer extends, with an edge section or portion thereof, beyond the melted or sintered part of the previous layer such that these edge sections of the individual layers are not supported by a melted or sintered part of the respective previous layer. This leads to the areas sinking into the powder bed under their own weight if the individual edge sections in each case project too far beyond the respective previous layer.

A possible measure is to select the extension of the edge sections such that the step structure provided by the individual layers on the surfaces of the areas stabilizes these sufficiently to prevent the sinking in. The exact demands on this step structure depend, among other things, on the structure and the dimensions of the object and on what forces act on the overhanging areas as a result of this. However, it has been found that problems can be reliably avoided if the surfaces of the overhanging areas do not exceed an angle of 50° with respect to the direction of the force of gravity during the layered construction. It is to be noted that, in the framework of this application, as is customary the outline, extension or course of a surface disregards the step structure which is always present, i.e. represents an averaging over the step structure.

If this condition cannot be met—for example because of the demands on the object to be produced in terms of geometric shape—support structures must be provided for the overhanging areas, which support structures either are mechanically or chemically removed once the object is completed or remain in the object. In either case, support structures mean additional material expenditure and thereby increase the weight and the cost of the object.

This is to be borne in mind, among other things, in the case of two portions or sections of the three-dimensional object, which are spaced apart from one another in the direction of construction and which must be connected to one another by a support structure and in which, in the case of an unsuitable design of the support structure, the second section would have an outer surface which borders or defines an overhanging area, in the above sense, during the layer-by-layer construction and extends at an angle of e.g. more than 45° or 50° in relation to the direction of the force of gravity.

SUMMARY

It is an object of the invention to achieve a cost and weight saving in the case of a three-dimensional object with two portions or sections, which are connected to one another by a support structure. The object can for example be a hydraulic distribution system or a part of a hydraulic distribution system.

This object is achieved by a method described herein and a three-dimensional object described herein. Advantageous embodiments of the method and of the object are also disclosed herein.

BRIEF DESCRIPTION OF THE DRAWINGS

A preferred embodiment of the invention is explained in more detail below with reference to the drawings, in which:

FIG. 1a shows a perspective view of a three-dimensional object which has been produced according to an embodiment of the invention by an additive layer manufacturing method and has a plate and a straight tube section, which are connected to one another by a support structure;

FIG. 1b shows a cross-sectional view of the object from FIG. 1a perpendicular to the longitudinal axis of the tube section;

DETAILED DESCRIPTION

Figure 2A:
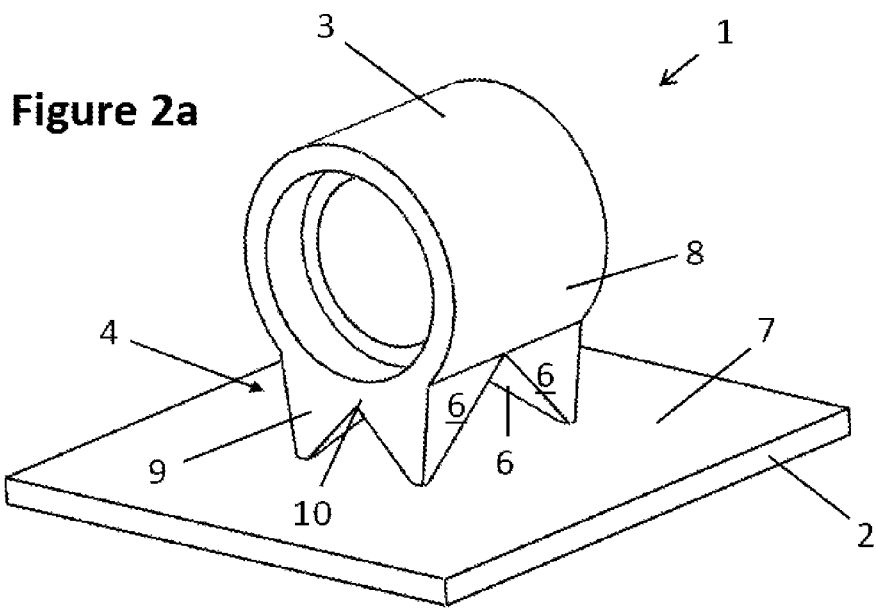
FIG. 2a shows a perspective view of a three-dimensional object which has been produced according to a further embodiment of the invention by an additive layer manufacturing method and has a plate and a straight tube section, which are connected to one another by a support structure.

According to the present invention a generative or additive layer manufacturing method is provided for producing a three-dimensional object, in which, in the manner already explained, a plurality of layers of a powder material are applied one after the other and one on top of the other to (i.e. arranged or deposited one after the other and one on top of the other on) a carrier, in particular a flat platform or a flat table, and each layer is irradiated, before the following layer is applied, with a laser beam or particle beam selectively only in the areas of the layer which correspond to the three-dimensional object to be produced. The irradiation takes place in such a way that the powder material in the corresponding areas is locally melted or sintered. The three-dimensional object can be preferably a hydraulic distribution system or a part of a hydraulic distribution system.

The object produced by the method, i.e. the result of the method, has a first portion or section, a second portion or section and a support structure between the first and the second portion, which support structure connects the first and the second portion to one another. The portions are arranged such that in the course of the layer-by-layer construction (i.e. in the course of the layer-by-layer manufacture) of the object the first portion is constructed (i.e. manufactured) before the second portion, i.e. the construction of the second portion only begins once the construction of the first portion has finished.

In the method according to the invention, however, the support structure is constructed in the form of a plurality of support legs, which extend in each case from the first portion to the second portion and are connected, at their opposite ends, to these two portions. The support legs are spaced apart from one another along part of their length, so that, in contrast to a solid support structure, openings or voids are present in the support structure. It is to be noted that the support structure formed by the support legs is later part of the completed object and is not removed from it.

This procedure has the advantage that, just as with a solid support structure, sufficient support can be provided for the second portion in the area of its outer surface but at the same time the spacing of the support legs reduces the amount of material used and thus a weight and cost saving is achieved. This also applies if, because the conditions discussed above are not met, in addition to the support legs, additional support elements also have to be provided temporarily between the first and the second portion during the layer-by-layer construction, which support elements are then removed mechanically or chemically for the final completion of the object, in contrast to the support legs. Even if such additional support elements have to be provided temporarily, the amount of material used can be significantly reduced because of the provision of the support legs, which are at least partially spaced apart from one another.

In a preferred embodiment the support legs are designed and arranged such that each support leg widens along its entire length or at least in a longitudinal section adjoining the second portion in the direction of construction defined by the step-wise layer-by-layer construction or in the direction towards the second portion. In this way, overhangs of the second portion, in which the outer surface of the second portion has too great an inclination in relation to the direction of the force of gravity, in the manner explained above, can be reduced or eliminated like with a solid support structure. For this reason, it is also possible to reduce or eliminate the need to use additional temporary support elements.

In this embodiment it is particularly preferred if, during the layer-by-layer construction of the object, all sections of the outer surfaces of the support legs which, viewed opposite or contrary to the direction of the force of gravity—or in other words in relation to the direction of the force of gravity—define an overhang do not exceed an inclination angle of 50° and preferably of 45° in relation to the direction of the force of gravity. This means that the outer surfaces of the widening longitudinal section do not exceed an angle of 50° and preferably of 45° in relation to the direction of the force of gravity. In other words, in the framework of this application the inclination angle of a surface section or region of an overhang can also be envisaged such that a cross section through the overhang along a plane is considered, which plane extends parallel to the direction of the force of gravity and through the considered surface section in such a way that the plane in the surface section is perpendicular to the steps formed by the layers. A tangent is applied to the contour of the overhang which is obtained through this cross section and averaged over the steps or step structure at the site where the surface section is being considered, and the inclination angle is then the angle between the tangent and the direction of the force of gravity.

If this condition is met no additional support elements have to be provided for the support legs. Even if it is advantageous for the condition to be fulfilled everywhere on the support legs, it is also possible and, in certain situations, can be advantageous if the condition is not fulfilled everywhere but—for all support legs or at least for some of the support legs—is only fulfilled everywhere except in sections of the outer surfaces located in areas of the outer surfaces, facing one another, of neighbouring support legs at their ends facing the second portion. This allows greater freedom in the arrangement and design of the support legs, but may have to be paid for by providing additional temporary support elements.

In a preferred embodiment the support legs are constructed such that, (a) for at least some neighbouring or adjacent ones of the support legs, their ends connected to the second portion are spaced apart from one another (then conventional support elements are additionally required between neighbouring spaced-apart support legs, which support elements are subsequently removed), (b) for at least some neighbouring or adjacent ones of the support legs, their ends connected to the second portion touch one another at the second portion and/or, (c) for at least some neighbouring or adjacent ones of the support legs, the outer surfaces, facing one another, of the ends, facing the second portion, of the respective neighbouring support legs merge, forming an arc-shaped rounding, wherein the radius of curvature of the rounding is dimensioned such that the overhanging area of solidified material which corresponds to the rounding does not sink into the powder bed. It is preferably 7 mm at most.

In this embodiment either one of the options (a) to (c) can be provided for all support legs or two or three of the options can be provided for different support legs respectively. In the case of option (a) it can be necessary to provide additional temporary support elements between the respectively neighbouring or adjacent support legs. This can only be dispensed with if the spacing between the support legs is very small. The maximum allowable distance is determined by material and process parameters but in any case is at least 1 mm. If only options (b) and (c) are provided, the support structure can provide a continuous support portion which is arranged directly adjoining the second portion and merges with this, and to which the outer surface of the second portion connects on all sides, wherein neighbouring support legs in each case touch at their ends facing the second portion and merge, and in this way the support legs in their entirety form the continuous support portion.

In a preferred embodiment the layer-by-layer construction is carried out such that, during the layer-by-layer construction of the object with the exception of areas of the outer surface of the second portion present between the support legs—i.e. with the exception of an area of the outer surface of the second portion, in which the support structure is connected to the second portion—all sections of the outer surfaces of the second portion which, viewed contrary to the direction of the force of gravity—and thus in relation to the direction of the force of gravity—define an overhang do not exceed an inclination angle of 50° and preferably of 45° in relation to the direction of the force of gravity, at least on the side of the second portion facing the first portion.

This can take place on the side of the second portion facing the first portion in an advantageous way by a suitable design and arrangement of the support legs and is made easier if the support legs widen in the direction of the second portion. This procedure has the advantage that, just as with a solid support structure, sufficient support can be provided for the second portion in the area of its outer surface but at the same time the spacing of the support legs reduces the amount of material used and thus a weight and cost saving is achieved.

In this embodiment it can be provided for example that, on the side of the second portion facing the first portion, sections of the outer surfaces of the second portion connect to or follow the area in which the support legs are connected to the second section, or connect to or follow a support portion formed by the support legs together as described above and, viewed in the direction contrary to the direction of the force of gravity, define an increasingly overhanging, projecting or cantilevered area of the second portion. In an alternative embodiment the area in which the support legs are connected to the second portion, or the support portion, extends over the entire side of the second portion facing the first portion. There is then no overhang in the above sense on the side facing the first portion.

In a preferred embodiment the first portion and the second portion are functional portions or sections, which fulfil a function going beyond a support function in the completed three-dimensional object. Thus, in the case of a hydraulic distribution system for example, the first portion could be a plate and the second portion could be a tube or pipe portion or section, which is supported on the plate by means of the support structure and serves to convey fluids through it. The plate and the tube section are then functional portions, since the tube section serves to convey fluids and the plate serves to secure to a surface or to secure further components of the hydraulic distribution system. In general—in particular in cases in which the completed three-dimensional object is a hydraulic distribution system, a part of a hydraulic distribution system or another system which is provided for conveying fluid or comprises conveying fluid—functional portions or sections can be for example elements adapted and provided for conveying a fluid therethrough, such as for instance tubular or channel-shaped sections having a circular or any other cross section, holding or securing elements for holding or securing the completed three-dimensional object to another object, or cable channels.

In a preferred embodiment the first portion is a flat plate. In the framework of this embodiment it is particularly preferred if the plate is oriented perpendicular to the direction of the force of gravity during the layer-by-layer construction of the object. The first portion can, however, also have different shapes and can be for instance an elongate element, such as for example a tube or tube section with a circular, oval, rectangular, square or any other cross-sectional shape or another element suitable for conveying a fluid through it.

In a preferred embodiment the second portion is a straight or curved elongate element, the longitudinal axis or direction of extension of which during the layer-by-layer construction of the object along the entire length or at least along part of the length of the elongate element extends at an angle of more than 45°, more preferably at an angle of more than 50° and most preferably in a plane perpendicular to the direction of the force of gravity. In the framework of this embodiment it is particularly preferred if the elongate element is a tube or pipe or a tube or pipe section or a cylindrical element. Then, in cross section perpendicular to its direction of extension, the element can be for example circular, oval, rectangular or square or also have any other cross-sectional shape.

If the two embodiments mentioned previously are combined, it is preferred if the direction of extension or longitudinal axis of the elongate element extends in a plane parallel to the plane defined by the plate. It is particularly preferred if the elongate element is straight. The same applies in cases in which the first and the second portion are elongate elements.

In embodiments in which the second portion is an elongate element, it is preferred if the support legs are constructed and arranged such that they are arranged in transverse and longitudinal rows perpendicular to one another in relation to the direction of extension or longitudinal axis of the elongate element. Each transverse row can, for example, consist of two support legs.

In a preferred embodiment the support legs are constructed such that at least some of the support legs, directly adjoining the first portion, have an area in which they taper in the direction of construction defined by the layer-by-layer construction and which is followed by the longitudinal section or portion of the respective support leg, which widens in the direction of construction, preferably such that the latter longitudinal section or portion connects directly to the area. In the latter case, each support leg consists of a section or portion which is part of the support portion, the longitudinal section or portion, which widens in the direction of construction, and the area which tapers in the direction of construction. In an alternative preferred embodiment the longitudinal section or portion which widens in the direction of construction is connected directly to the first portion.

It is preferred if the additive layer manufacturing method is selective laser melting (SLM), selective laser sintering (SLS), selective electron beam melting or selective electron beam sintering.

The invention also relates to a three-dimensional object which has been or can be produced using one of the methods previously mentioned and which has a structure which is evident from the previous explanations. In particular the invention thus relates generally to a three-dimensional object which can be produced and preferably has been produced using one of the method embodiments mentioned previously, with a first portion, a second portion and a support structure between the first and the second portion, which support structure connects the first and the second portion to one another. The support structure is designed in the form of a plurality of support legs, which extend in each case from the first portion to the second portion and are connected to these at their opposite ends and which are spaced apart from one another at least along part of their length.

In a preferred embodiment the second portion is a curved elongate element, the direction of extension of which is curved in a plane or spatially, preferably in such a way that in each orientation of the three-dimensional object the direction of extension along the entire length or at least along part of the length of the second portion extends at an angle of more than 45° and more preferably at an angle of more than 50° to the direction of the force of gravity.

The three-dimensional object is preferably a hydraulic distribution system or a part of a hydraulic distribution system.

The three-dimensional object 1 from FIGS. 1a and 1b has a first portion or section 2 in the form of a flat plate of constant thickness, a second portion or section 3 spaced apart from the first portion 2 in the form of a straight tube or pipe section with a circular inner and outer diameter and a support structure 4, which extends along the entire length of the tube section 3 between the plate 2 and the tube section 3. The plate 2 is provided for holding the object 1 against another object and the tube section 3 is provided for conveying a fluid between its ends. In contrast to the support structure 4 they are, therefore, functional sections or elements. The object 1 is preferably a hydraulic distribution system or a part of a hydraulic distribution system.

In the cross-section view of FIG. 1b, the object 1 is shown in the orientation in which it was or is also situated during the layer-by-layer construction, i.e. while the additive layer manufacturing method is being carried out, wherein the dashed arrow 5 indicates the direction of the force of gravity. This means that the plate 2 is oriented perpendicular to the direction of the force of gravity and that the direction of construction defined by the layer-by-layer construction extends antiparallel to the direction of the force of gravity and perpendicular to the horizontal surface 7 of the plate 2.

The support structure 4 has several and in the example shown four support legs 9, which are spaced apart from one another along a large part of their length such that the support structure 4 is not solid. The support legs 9 widen continuously in the direction from the plate 2 to the tube section 3 and, directly adjoining the tube section 3, touch in such a way that they form a continuous support portion 10 below the tube section 3. The support structure 4 of this object is symmetrical in relation to the plane spanned by the direction of extension or longitudinal axis of the tube section 3 and of the arrow 5.

As is clear in particular from looking at FIG. 1b, the outer surfaces 6 of the individual support legs 9 are arranged however such that they extend at an angle of more than 45° to the horizontal surface 7 of the plate 2. This means at the same time, in the case shown of the horizontal orientation of the flat plate surface 7, that the outer surfaces 6 extend at an angle of not more than 45° in relation to the direction of the force of gravity. In the framework of this application, angles of an outer surface in relation to the direction of the force of gravity are always measured such that the angle is at most 90°, i.e. the smaller of the two possible angles is always used. The only exception is between respectively adjacent support legs 9 in the area in which they merge to form the continuous support portion 10. This transition area is formed as a rounding 14 which has a radius of curvature of 7 mm at most. Such a rounding can be constructed without support in this range of the radius of curvature despite the above inclination angle being exceeded.

The support legs 9 are constructed in such a way, and in particular directly adjoining the tube section 3 are widened to such an extent, that the outer surface 8 of the tube section 3 on its side facing the plate 2 does not exceed an angle of 45° in relation to the direction of the force of gravity. As can be seen from FIG. 1b, the outer surface 8 of the tube section 3 has its maximum angle directly adjoining the support structure 4, which angle is marked by the dot-dash line. If the support legs 9 were widened to a lesser extent or provided a narrower support in cross section, the outer surface 8 of the tube section 3 would increase in size and have areas in which the angle is greater than 45°. The support structure 4 is designed in just such a way as to avoid this.

Figure 3:
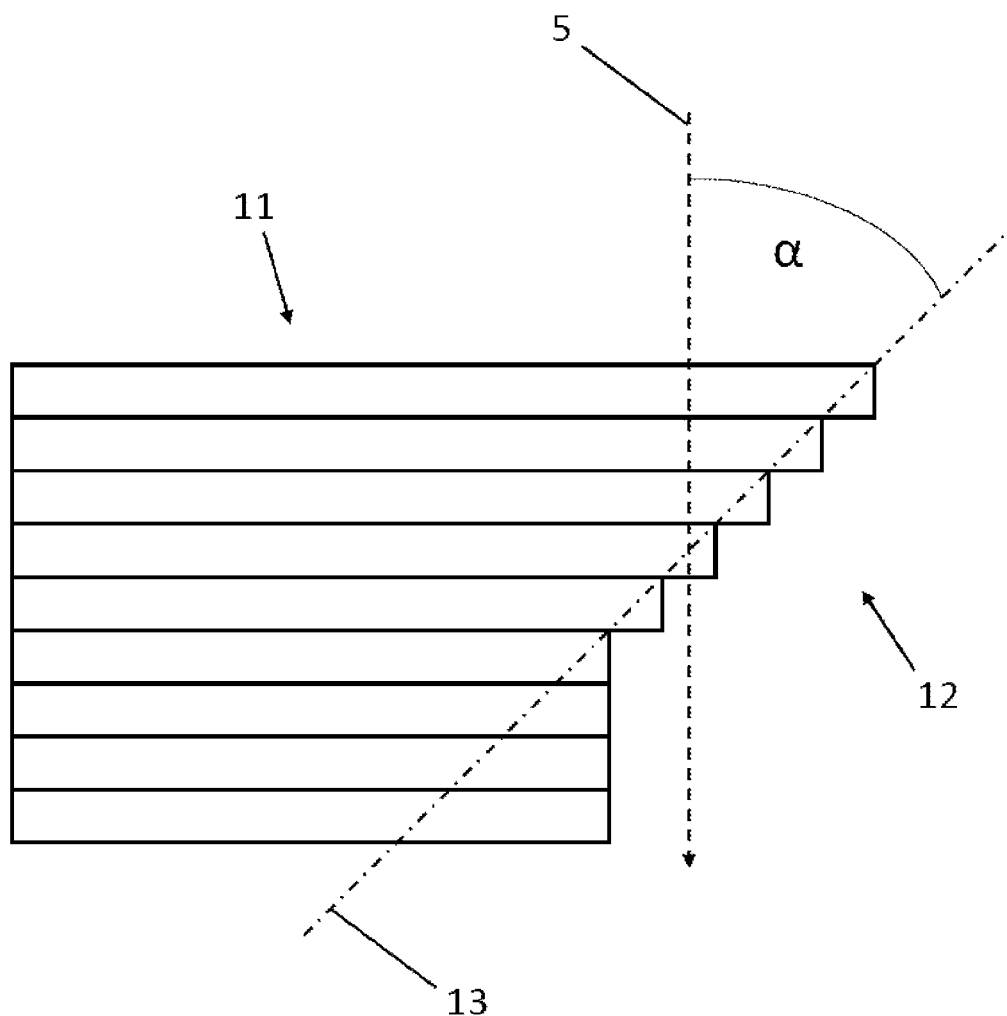
FIG. 3 shows a schematic representation of an overhang.

In other words neither the support legs 9 nor the outer surface 8 of the tube section 3, viewed contrary to the direction of the force of gravity, have an overhang with an inclination of the outer surface of more than 45° in relation to the direction of the force of gravity. FIG. 3 shows, by means of a simplified example, that the course, extension or path of the outer surface in this connection is averaged over the step structure caused by the layer-by-layer construction. FIG. 3 shows a small partial section 11 of a three-dimensional object which has an overhang 12. The course, extension or path of the surface bordering the overhang 12 is indicated by the dot-dash line 13, which for each layer of the overhang 12 extends in each case through the point at which the layer projects beyond the previous layer.

Figure 2B:
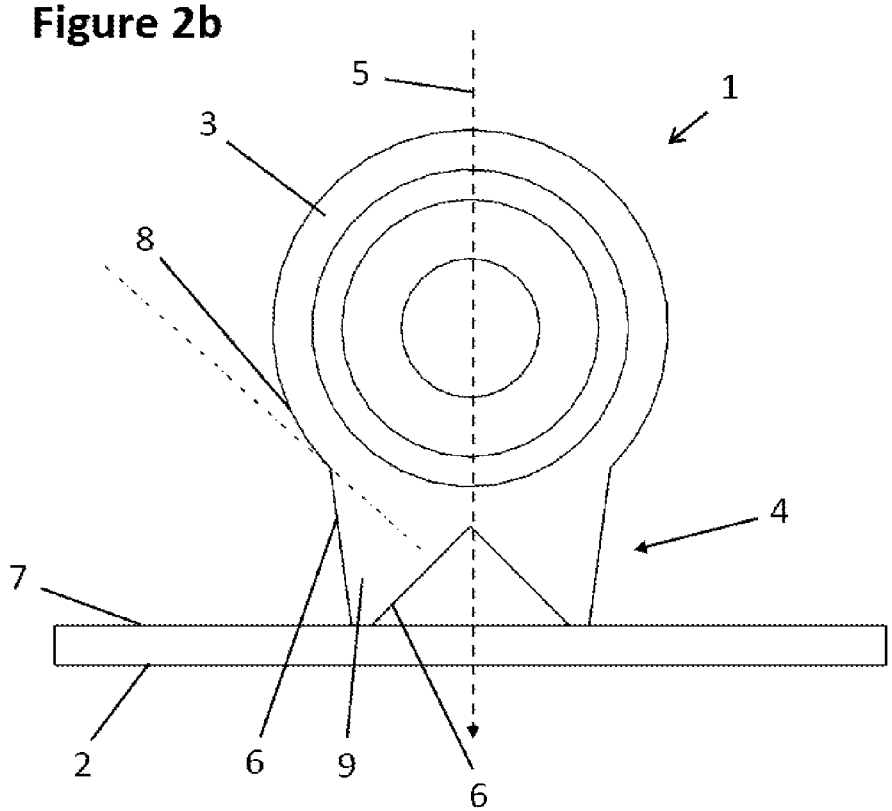
FIG. 2b shows a cross-sectional view of the object from FIG. 2a perpendicular to the longitudinal axis of the tube section.

The three-dimensional object 1 from FIGS. 2a and 2b is almost identical to the object 1 from FIGS. 1a and 1b. The only difference consists in the fact that neighbouring or adjacent support legs 9 only touch directly at the tube section 3, with the result that no rounding exists between neighbouring support legs 9. Rather the entire outer surfaces 6 of the support legs 4 extend everywhere at an angle of not more than 45° in relation to the direction of the force of gravity. Also, no continuous support portion 10 is formed by the support legs 4 in this embodiment example.

In each case, the support structure 4 achieves the aim of a suitable support for the tube section 3 using the above design, with the result that the object 1 can be produced in the shown orientation by an additive layer manufacturing method. At the same time, providing spaced-apart support legs achieves a saving on material and consequently a cost and weight saving.

The invention claimed is:

1. An additive layer manufacturing method for producing a three-dimensional object, wherein in the method a plurality of layers of a powder material are applied one after another and one on top of another to a carrier and each layer is irradiated, before a following layer is applied, with a laser beam or particle beam selectively only in areas of the layer which correspond to the three-dimensional object to be produced, wherein the irradiation takes place such that the powder material in the corresponding areas is locally melted or sintered, wherein:
the object has a first portion, a second portion and a support structure between the first and the second portion, which connects the first and the second portion to one another, wherein in the course of the layer-by-layer construction of the object the first portion is constructed before the second portion or the first portion is provided as a separate component, on which the support structure and the second portion are constructed; and
in the method the support structure is constructed in a form of a plurality of support legs, which extend in each case from the first portion to the second portion and are connected to these at their opposite ends and are spaced apart from one another at least along part of their length.

2. The method according to claim 1 wherein the support legs are designed and arranged such that each support leg widens at least in a longitudinal section adjoining the second portion in a direction of construction defined by the layer-by-layer construction.

3. The method according to claim 2, wherein during the layer-by-layer construction of the object:
all sections of the outer surfaces of the support legs which, viewed contrary to a direction of force of gravity, define an overhang do not exceed an inclination angle of 50° in relation to the direction of force of gravity; or
with exception of sections of the outer surfaces in areas of the outer surfaces, facing one another, of adjacent support legs at their ends facing the second portion, all sections of the outer surfaces of the support legs which, viewed contrary to the direction of force of gravity, define an overhang do not exceed an inclination angle of 50° in relation to the direction of force of gravity.

4. The method according to claim 1, wherein the support legs are constructed such that,
for at least some adjacent ones of the support legs, their ends connected to the second portion are spaced apart from one another,
for at least some adjacent ones of the support legs, their ends connected to the second portion touch one another at the second portion and/or,
for at least some adjacent ones of the support legs, the outer surfaces, facing one another, of the ends, facing the second portion, of the respective adjacent support legs merge, forming an arc-shaped rounding, wherein the radius of curvature of the rounding is 7 mm at most.

5. The method according to claim 1, wherein during the layer-by-layer construction of the object, except for areas of the outer surface of the second portion located between the support legs, all sections of the outer surfaces of the second portion which, viewed contrary to a direction of force of gravity, define an overhang do not exceed an inclination angle of 50° in relation to a direction of force of gravity, at least on the side of the second portion facing the first portion.

6. The method according to claim 1, wherein the first portion and the second portion are functional sections, which fulfil a function going beyond a support function between two portions in a completed object.

7. The method according to claim 1, wherein the first portion is a flat plate.

8. The method according to claim 7, wherein the plate is oriented perpendicular to a direction of force of gravity during the layer-by-layer construction of the object.

9. The method according to claim 1, wherein the second portion is an elongate element, the direction of extension of which during the layer-by-layer construction of the object extends at an angle of more than 45° to a direction of force of gravity at least along part of a length of the element.

10. The method according to claim 9, wherein the elongate element is a tube or pipe or a cylindrical element.

11. The method according to claim 7, wherein the second portion is an elongate element, the direction of extension of which during the layer-by-layer construction of the object extends at an angle of more than 45° to a direction of force of gravity at least along part of a length of the element and wherein the elongate element extends in a plane parallel to a plane defined by the plate.

12. The method according to claim 11, wherein the elongate element is a tube or pipe or a cylindrical element.

13. The method according to claim 9, wherein the support legs are constructed and arranged such that they are arranged in transverse and longitudinal rows perpendicular to one another in relation to the direction of extension of the elongate element.

14. The method according to claim 1, wherein the support legs are constructed such that at least some of the support legs, directly adjoining the first portion, have an area in which they taper in a direction of construction defined by the layer-by-layer construction and which a longitudinal section of the respective support leg which widens in the direction of construction follows.

15. The method according to claim 1, wherein selective laser melting (SLM), selective laser sintering (SLS), selective electron beam melting or selective electron beam sintering is used as the additive layer manufacturing method.

16. The method according to claim 1, wherein the object is a hydraulic distribution system or a part of a hydraulic distribution system.

17. The method according to claim 1, wherein the second portion is an elongate element, a direction of extension of which during the layer-by-layer construction of the object extends at an angle perpendicular to a direction of force of gravity at least along part of a length of the element.

18. The method according to claim 17, wherein the elongate element is a tube or pipe or a cylindrical element.

19. The method according to claim 7, wherein the second portion is an elongate element, a direction of extension of which during the layer-by-layer construction of the object extends at an angle perpendicular to a direction of force of gravity at least along part of a length of the element and wherein the elongate element extends in a plane parallel to a plane defined by the plate.

20. The method according to claim 19, wherein the elongate element is a tube or pipe or a cylindrical element.

21. The method according to claim 17, wherein the support legs are constructed and arranged such that they are arranged in transverse and longitudinal rows perpendicular to one another in relation to a direction of extension of the elongate element.

\* \* \* \* \*